(12) United States Patent
Yamasaki et al.

(10) Patent No.: US 8,636,839 B2
(45) Date of Patent: Jan. 28, 2014

(54) INK JET INK, INK CARTRIDGE, AND INK JET RECORDING METHOD

(75) Inventors: Kousuke Yamasaki, Kawasaki (JP); Daiji Okamura, Tokyo (JP); Mitsuru Ishii, Kamagaya (JP); Yuuki Nishino, Tokyo (JP); Hirofumi Ichinose, Tokyo (JP); Hiroshi Tomioka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 12/967,398

(22) Filed: Dec. 14, 2010

(65) Prior Publication Data
US 2011/0143040 A1    Jun. 16, 2011

(30) Foreign Application Priority Data
Dec. 16, 2009  (JP) ................. 2009-285781

(51) Int. Cl.
*C09D 11/02* (2006.01)
*C09D 1/02* (2006.01)
*C09K 3/00* (2006.01)
*C08L 75/00* (2006.01)

(52) U.S. Cl.
USPC .............. 106/31.13; 106/31.6; 106/37.75; 524/590; 347/100

(58) Field of Classification Search
USPC .................................. 524/590; 347/100
See application file for complete search history.

(56) References Cited

U.S. PATENT DOCUMENTS

| | | | |
|---|---|---|---|
| 7,176,248 B2 * | 2/2007 | Valentini et al. | 523/160 |
| 7,205,356 B2 * | 4/2007 | Gurtler et al. | 524/590 |
| 8,506,069 B2 * | 8/2013 | Saito | 347/100 |
| 2003/0116058 A1 * | 6/2003 | Hopper et al. | 106/31.43 |
| 2008/0234428 A1 * | 9/2008 | Furutani et al. | 524/599 |
| 2009/0011155 A1 * | 1/2009 | Kamo et al. | 428/32.25 |
| 2009/0139430 A1 * | 6/2009 | Hino et al. | 106/31.6 |
| 2010/0137501 A1 * | 6/2010 | Moncla et al. | 524/539 |
| 2011/0014554 A1 * | 1/2011 | Kaneko | 430/7 |

FOREIGN PATENT DOCUMENTS

| | | | |
|---|---|---|---|
| JP | 2000-248213 A | | 9/2000 |
| JP | 2000248213 A | * | 9/2000 |
| JP | 2008024733 A | * | 2/2008 |
| JP | 2008-266595 A | | 11/2008 |

OTHER PUBLICATIONS

JP2008024733A English Translation.*
JP2000248213A English Translation.*
12967398-433869—EICSEARCH_Search Report.*

* cited by examiner

*Primary Examiner* — Dah-Wei Yuan
*Assistant Examiner* — Diane Zhang
(74) *Attorney, Agent, or Firm* — Canon USA Inc. IP Division

(57) ABSTRACT

An ink jet ink contains a pigment and a polyurethane polymer. The polyurethane polymer contains units derived from a polyisocyanate, a polyol, a compound having a carboxy group, and a compound having a sulfo group, and an acid value of the polyurethane polymer is 20 mgKOH/g or more and 100 mgKOH/g or less.

6 Claims, No Drawings

INK JET INK, INK CARTRIDGE, AND INK JET RECORDING METHOD

BACKGROUND OF THE INVENTION

1. Field of the Invention

The present invention relates to an ink jet ink, an ink cartridge containing the ink jet ink, and an ink jet recording method.

2. Description of the Related Art

With improvements in image quality and recording speed, ink jet recording apparatuses are increasingly being used in business. Examples of performance requirements required for ink jet inks for use in business include, but are not limited to, ink reliability (such as ejection stability) and image fastness property (such as scratch resistance and highlighter resistance). In order to improve these performance requirements, various inks containing a polyurethane polymer and a pigment have been investigated (Japanese Patent Laid-Open No. 2008-266595 and Japanese Patent Laid-Open No. 2000-248213). Japanese Patent Laid-Open No. 2008-266595 discloses a pigment dispersion containing a polyurethane polymer that is produced by the reaction of a urethane prepolymer, a polyol, and a polyisocyanate. The urethane prepolymer has one or two carboxy groups per molecule and has a defined isocyanate reaction rate. Japanese Patent Laid-Open No. 2000-248213 discloses a recording liquid containing a polyurethane polymer in which a polyisocyanate has a symmetrical six-membered ring.

The present inventors found that conventional inks containing a pigment and a polyurethane polymer have improved ink reliability and image fastness property but still do not satisfy recent requirements in business.

The present inventors found that in polyurethane polymers as described in Japanese Patent Laid-Open No. 2008-266595, a decrease in acid value increases hydrophobicity, resulting in a marked decrease in ink ejection stability. On the other hand, an increase in acid value improves ink ejection stability but disadvantageously increases the proportion of a hard segment in the polyurethane polymer, resulting in a decrease in the scratch resistance and highlighter resistance of images. The hard segment is mainly composed of a polyisocyanate, a compound having an acid group, and a chain extension agent. Thus, it is difficult even for an ink according to Japanese Patent Laid-Open No. 2008-266595 to satisfy both ink ejection stability and the scratch resistance and highlighter resistance of images.

In Japanese Patent Laid-Open No. 2000-248213, the polyurethane polymer has only a sulfo group as an acid group to improve the dispersion stability of carbon black. However, there is no discussion on the effects of the polyurethane polymer having a sulfo group on ink ejection stability or the scratch resistance and highlighter resistance of images. Furthermore, the polyurethane polymer having a sulfo group alone has an insufficient hydrophilic-hydrophobic balance, resulting in low scratch resistance and highlighter resistance of images.

SUMMARY OF THE INVENTION

The present invention provides an ink jet ink that can achieve high scratch resistance and highlighter resistance of images and excellent ink ejection stability. The present invention also provides an ink cartridge containing an ink according to an embodiment of the present invention and an ink jet recording method.

The object described above can be achieved by the present invention described below. An ink jet ink according to one aspect of the present invention contains a pigment and a polyurethane polymer. The polyurethane polymer contains units derived from a polyisocyanate, a polyol, a compound having a carboxy group, and a compound having a sulfo group, and an acid value of the polyurethane polymer is 20 mgKOH/g or more and 100 mgKOH/g or less.

The present invention can provide an ink jet ink that can achieve high scratch resistance and highlighter resistance of images and excellent ink ejection stability. The present invention can also provide an ink cartridge containing an ink according to an embodiment of the present invention and an ink jet recording method.

Further features of the present invention will become apparent from the following description of exemplary embodiments with reference to the attached drawings.

DESCRIPTION OF THE EMBODIMENTS

The present invention will be described in detail in the following embodiments. An ink jet ink (hereinafter also referred to as an "ink") according to an embodiment of the present invention contains a pigment and a polyurethane polymer. The polyurethane polymer contains units derived from a polyisocyanate, a polyol, a compound having a carboxy group, and a compound having a sulfo group, and an acid value of the polyurethane polymer is 20 mgKOH/g or more and 100 mgKOH/g or less.

The present inventors have investigated various inks containing a polyurethane polymer to provide an ink that can achieve high scratch resistance and highlighter resistance of images and excellent ink ejection stability. The present inventors found that inclusion of a polyurethane polymer improved the scratch resistance and highlighter resistance of images but lowered ink ejection stability. In order to improve ink ejection stability, therefore, the acid value of a polyurethane polymer was increased to increase the hydrophilicity of the polyurethane polymer. This improved ink ejection stability but lowered the scratch resistance and highlighter resistance of images. Thus, there was a trade-off between ink ejection stability and the scratch resistance and highlighter resistance of images. On the basis of these results, the present inventors satisfied both excellent ink ejection stability and high scratch resistance and highlighter resistance of images by adjusting the acid value of a polyurethane polymer and the type of acid group of the polyurethane polymer to balance hydrophilicity and hydrophobicity. The present invention will be further described in the following embodiments.

First, the present inventors investigated the reason for the trade-off between the ink ejection stability of an ink containing a polyurethane polymer and the scratch resistance and highlighter resistance of images. The polyurethane polymer is mainly composed of two segments: a hard segment and a soft segment. The hard segment is mainly composed of a polyisocyanate, a compound having an acid group, and a chain extension agent. The soft segment is mainly composed of a polyol. The hard segment substantially contributes to high strength, while the soft segment substantially contributes to flexibility. A micro phase separation structure of the two segments imparts high strength and flexibility, that is, high elasticity to a film of the polyurethane polymer. These characteristics of the polyurethane polymer film are closely related to the scratch resistance and highlighter resistance of images.

In order to improve ink ejection stability, the acid value of the polyurethane polymer must be increased to increase the hydrophilicity of the polyurethane polymer. The acid value of the polyurethane polymer is substantially proportional to the amount of a unit derived from a compound having an acid group. The amount of compound having an acid group must therefore be increased to improve ink ejection stability. For example, when dimethylolpropionic acid (DMPA), which has two hydroxy groups, is used as the compound having an acid group, the number of hydroxy groups increases with increasing DMPA content. An increase in DMPA content is therefore compensated for by a decrease in the amount of polyol reactive with isocyanate. A high DMPA content can result in an increase in the number of urethane bonds in the molecular chain and consequently an increase in strength. A decrease in the amount of soft segment, the polyol, results in low flexibility. The resulting polyurethane polymer film is therefore very rigid and has low image fastness property. Thus, an increase in the amount of compound having an acid group (an increase in acid value) increases hydrophilicity and consequently improves ink ejection stability but disadvantageously decreases the scratch resistance and highlighter resistance of images.

In order to increase the flexibility of the polyurethane polymer film, it is effective to increase the soft segment, the polyol. However, an increase in the amount of polyol reactive with isocyanate is compensated for by a decrease in the amount of compound having an acid group reactive with isocyanate (a decrease in acid value). A decrease in acid value decreases the hydrophilicity of the polyurethane polymer. Thus, an increase in the amount of polyol increases the flexibility of the film and consequently improves the scratch resistance and highlighter resistance of images but disadvantageously decreases ink ejection stability.

As described above, the characteristics of the polyurethane polymer film, which are closely related to the scratch resistance and highlighter resistance of images, depend on the acid value. Adjusting the hydrophilic-hydrophobic balance only by increasing or decreasing the acid value rarely satisfies both the scratch resistance and highlighter resistance of images and ink ejection stability.

The present inventors tried to adjust the hydrophilic-hydrophobic balance of the polyurethane polymer while the polyurethane polymer film has desired characteristics. The present inventors found that a polyurethane polymer having a carboxy group and a sulfo group can balance hydrophilicity and hydrophobicity while the polyurethane polymer film has desired characteristics. In particular, combined use of a carboxy group and a sulfo group can markedly improve the scratch resistance and highlighter resistance of images and ink ejection stability, as compared with use of the carboxy group alone or use of the sulfo group alone. The present inventors believe the reason for that is as follows.

A hard segment of a polyurethane polymer only having a carboxy group as a hydrophilic acid unit exhibits strength through various mechanisms. Examples of the mechanisms include intermolecular hydrogen bonds between one urethane bond and another urethane bond and between a urethane bond and a carboxy group, a hydrophobic interaction between polyisocyanates, and a repeating structure of low-molecular-weight compounds composed of a polyisocyanate and a compound having a carboxy group. An increase in the amount of compound having a carboxy group (an increase in acid value) so as to increase the hydrophilicity of the polyurethane polymer enhances the mechanisms for exhibiting the strength of a hard segment. An increase in the amount of compound having a carboxy group correspondingly decreases the amount of soft segment, the polyol, resulting in a film having high strength but low flexibility.

In a polyurethane polymer having a carboxy group and a sulfo group as hydrophilic acid units, the sulfo group having a much higher hydrophilicity than the carboxy group promotes intermolecular hydration, thereby weakening the intermolecular hydrogen bond or hydrophobic interaction. This action of the sulfo group can prevent an excessive increase in the strength of the hard segment even at a high acid value. Thus, the polyurethane polymer having a carboxy group and a sulfo group as hydrophilic acid units can form a film having a better balance between strength and flexibility than a polyurethane polymer only having a carboxy group as the hydrophilic acid unit. Such film characteristics of the polyurethane polymer having a carboxy group and a sulfo group allow for high scratch resistance and highlighter resistance of images even at high acid values. At low acid values, the polyurethane polymer can also have high hydrophilicity because of the hydration effect of the sulfo group having very high hydrophilicity. The polyurethane polymer having a carboxy group and a sulfo group can therefore satisfy both high flexibility of a film and ink ejection stability at a low acid value.

The present inventors found that a polyurethane polymer having a carboxy group and a sulfo group as hydrophilic acid units has such effects at an acid value in the range of 20 to 100 mgKOH/g. At acid values outside this range, the ratio of the amount of compound having an acid group to the amount of polyol greatly affects the characteristics of a polyurethane polymer film and the hydrophilic-hydrophobic balance. This reduces the effects of the carboxy group and the sulfo group.

The effects of a carboxy group and a sulfo group are produced only in the case that a polyurethane polymer has both the sulfo group and the carboxy group in the molecule. In other words, the effects cannot be achieved in inks that contain a mixture of a polyurethane polymer having a sulfo group and a polyurethane polymer having a carboxy group.

Ink Jet Ink

The components of an ink jet ink according to an embodiment of the present invention will be described below.

Polyurethane Polymer

A polyurethane polymer for use in an ink according to an embodiment of the present invention contains units derived from a polyisocyanate, a polyol, a compound having a carboxy group, and a compound having a sulfo group, and an acid value of the polyurethane polymer is 20 mgKOH/g or more and 100 mgKOH/g or less.

Polyisocyanate

The term "polyisocyanate", as used herein, refers to a compound having two or more isocyanate groups. Examples of the polyisocyanate for use in the present invention include, but are not limited to, aliphatic polyisocyanates, alicyclic polyisocyanates, aromatic polyisocyanates, and araliphatic polyisocyanates.

Examples of the aliphatic polyisocyanate include, but are not limited to, tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of the alicyclic polyisocyanate include, but are not limited to, isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanatomethyl)cyclohexane. Examples of the aromatic polyisocyanate include, but are not limited to, tolylene diisocyanate, 2,2'-diphenylmethane diisocyanate, 2,4-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate. Examples of the araliphatic polyisocyanate include, but are not limited to, dialkyldiphenylmethane diisocyanates, tetraalkyldiphenylmethane diisocyanates, and α,α,α,α-tetramethylxylylene diisocyanate. These polyisocyanates may be used alone or in combination. Among these polyisocyanates, alicyclic polyisocyanates can be used in the present invention. Among the alicyclic polyisocyanates, an isophorone diisocyanate can be used.

Polyol

Examples of the polyol for use in the present invention include, but are not limited to, polyester polymers including polyester polyols, polyether polymers including polyether polyols, polycarbonate polymers including polycarbonate diols, and polymers including other polyols (for example, polyhydroxy polyacetal, polyhydroxy polyacrylate, polyhydroxy polyesteramide, and polyhydroxy polythioether). These polymers can also be used in combination. A polyol for use in the present invention can have 13 to 250 carbon atoms. A polyol having 13 to 250 carbon atoms can impart moderate flexibility to a film and has improving effects on the scratch resistance and highlighter resistance of images. The polyol can have a polystyrene equivalent number-average molecular weight in the range of 600 to 4,000 as determined by gel permeation chromatography (GPC). A number-average molecular weight below 600 may result in a film having low flexibility and insufficient improving effects on the scratch resistance and highlighter resistance of images. A number-average molecular weight above 4,000 may result in an excessively flexible film and insufficient improving effects on the scratch resistance and highlighter resistance of images.

Examples of the polyester polyols include, but are not limited to, esters derived by reacting acid components with poly(alkylene glycol)s, dihydric alcohols, and trivalent and higher valent alcohols. Examples of the acid components include, but are not limited to, aromatic dicarboxylic acids, alicyclic dicarboxylic acids, and aliphatic dicarboxylic acids. Examples of the aromatic dicarboxylic acids include, but are not limited to, isophthalic acid, terephthalic acid, orthophthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid. Examples of the alicyclic dicarboxylic acids include, but are not limited to, hydrogenated compounds of the aromatic dicarboxylic acids described above. Examples of the aliphatic dicarboxylic acids include, but are not limited to, malonic acid, succinic acid, tartaric acid, oxalic acid, glutaric acid, adipic acid, pimelic acid, suberic acid, azelaic acid, sebacic acid, alkylsuccinic acids, linoleic acid, maleic acid, fumaric acid, mesaconic acid, citraconic acid, and itaconic acid. Reactive derivatives of these acid components, such as acid anhydrides, alkyl esters, and acid halides, can also be used as acid components of the polyester polyols. The acid components of the polyester polyols may be used alone or in combination. These polyester polyols may be used alone or in combination. Examples of the poly(alkylene glycol)s include, but are not limited to, poly(ethylene glycol), poly(propylene glycol), poly(tetramethylene glycol), and an ethylene glycol-propylene glycol copolymer. Examples of the dihydric alcohols include, but are not limited to, hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the trivalent and higher valent alcohols include, but are not limited to, glycerin, trimethylolpropane, 1,2,5-hexanetriol, 1,2,6-hexanetriol, and pentaerythritol. These polyester polyols may be used alone or in combination.

Examples of the polyether polyols include, but are not limited to, addition polymers of alkylene oxides and poly (alkylene glycol)s, dihydric alcohols, and trivalent and higher valent alcohols. Examples of the poly(alkylene glycol)s include, but are not limited to, poly(ethylene glycol), poly (propylene glycol), poly(tetramethylene glycol), and an ethylene glycol-propylene glycol copolymer. Examples of the dihydric alcohols include, but are not limited to, hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the trivalent and higher valent alcohols include, but are not limited to, glycerin, trimethylolpropane, 1,2,5-hexanetriol, 1,2,6-hexanetriol, and pentaerythritol. Examples of the alkylene oxides include, but are not limited to, ethylene oxide, propylene oxide, butylene oxide, and α-olefin oxides. These polyether polyols may be used alone or in combination.

Examples of the polycarbonate diols include, but are not limited to, polycarbonate diols having 1,6-hexanediol as the basic skeleton and polycarbonate diols produced by known methods, for example, polycarbonate diols produced by the reaction between an aliphatic diol component and phosgene or a carbonate component, such as an alkylene carbonate, a diary carbonate, or a dialkyl carbonate. These polycarbonate diols may be used alone or in combination.

Among these polyols, the polyether polyols can be used in the present invention. The polyether polyols can impart moderate flexibility to the polyurethane polymer, thereby improving the scratch resistance and highlighter resistance of images. The polyether polyols have relatively high solubility in water and therefore improve ink ejection stability. Among the polyether polyols, poly(propylene glycol) can be used. The poly(propylene glycol) improves the hydrophilicity of a polyurethane polymer and ink ejection stability.

Compound Having Carboxy Group

A polyurethane polymer for use in the present invention contains a unit derived from a compound having a carboxy group. In the synthesis of a polyurethane polymer, a compound having a carboxy group is used to introduce the carboxy group into the polyurethane polymer. Examples of the compound having a carboxy group for use in the present invention include, but are not limited to, dimethylolacetic acid, dimethylolpropionic acid, and dimethylolbutanoic acid. At least one of dimethylolpropionic acid and dimethylolbutanoic acid can be used.

Compound Having Sulfo Group

A polyurethane polymer for use in the present invention contains a unit derived from a compound having a sulfo group. In the synthesis of a polyurethane polymer, a compound having a sulfo group is used to introduce the sulfo group into the polyurethane polymer. The following are examples of the compound having a sulfo group for use in the present invention.

Examples of a compound having a sulfo group and a terminal amino group include, but are not limited to, diaminopropanesulfonic acid, diaminobutanesulfonic acid, 3,6-diamino-2-toluenesulfonic acid, 2,4-diamino-5-toluenesulfonic acid, N-(2-aminoethyl)-2-aminoethanesulfonic acid, N-(2-aminoethyl)-2-aminobutanesulfonic acid, 2,4-diaminotoluenesulfonic acid, 4,4'-diaminostilbene-2,2'-disulfonic acid, diaminobenzenesulfonic acid, 4,4'-diaminodiphenyl-2,2'-disulfonic acid, and 2,4-diamino-diphenylethersulfonic acid. Examples of a compound having a sulfo group and a terminal hydroxy group include, but are not limited to, dihydroxypropanesulfonic acid, dihydroxybutanesulfonic acid, dihydroxybenzenesulfonic acid, 2,3-dihydroxynaphthalene-6-sulfonic acid, 1,8-dihydroxynaphthalene-3,6-disulfonic acid, 2,8-dihydroxynaphthalene-6-sulfonic acid, N,N-bis(2-hydroxyethyl)-2-aminoethanesulfonic acid, and N,N-bis(2-hydroxyethyl)-2-aminobutanesulfonic acid. Polyester polyols having a sulfo group and polycarbonate polyols having a sulfo group can also be used. The polyester polyols having a sulfo group may be produced by reacting a dicarboxylic acid having a sulfo group, such as sodium 5-sulfoisophthalate or potassium 5-sulfoisophthalate, with a diol, such as 1,6-hexanediol, followed by esterification with a polybasic acid, such as adipic acid. The polycarbonate polyols having a sulfo group may be produced by reacting a dicarboxylic acid having a sulfo group with a diol, followed by a reaction with a carbonate.

Among the compounds having a sulfo group, at least one of a compound having the following general formula (1), a compound having the following general formula (2), and a compound having the following general formula (3) can be used:

$$H_2N-R-(SO_3M)_n \quad (1)$$

$$HO-R-(SO_3M)_n \quad (2)$$

$$R'NH-R-(SO_3M)_n \quad (3)$$

wherein R and R' denote a hydrocarbon group having 1 to 20 carbon atoms, M denotes an alkali metal, ammonium, or an organic ammonium, and n is 1 or 2. The hydrocarbon group may be an acyclic hydrocarbon group, such as an alkylene group, an alicyclic hydrocarbon group, such as a cycloalkylene group, or an aromatic hydrocarbon group, such as an arylene group.

Examples of the compound having the general formula (1) include, but are not limited to, 2-aminoethanesulfonic acid, aminonaphthalenesulfonic acid, aminonaphthalenedisulfonic acid, and 2-amino-5-methylbenzenesulfonic acid. Examples of the compound having the general formula (2) include, but are not limited to, hydroxymethanesulfonic acid, hydroxyethanesulfonic acid, hydroxypropanesulfonic acid, hydroxyalkanesulfonic acids having 8 to 24 carbon atoms, and dihydroxyalkane mono- or di-sulfonic acids having 1 or 2 carbon atoms. Examples of the compound having the general formula (3) include, but are not limited to, 2-(methylamino)ethanesulfonic acid.

Use of at least one of the compounds having the general formulae (1), (2), and (3) can achieve higher levels of scratch resistance and highlighter resistance of images and ink ejection stability. This is probably because of the following reason. The compounds having the general formulae (1), (2), and (3) can react with a terminal isocyanate to yield a polyurethane molecular chain having terminal sulfo groups. The terminal sulfo groups have a larger hydration effect than internal sulfo groups. The polyurethane polymer can therefore have higher hydrophilicity and further improve ink ejection stability even at low acid values. The interaction of the terminal sulfo groups having a large hydration effect with water molecules tends to extend the molecular chain of the polyurethane polymer. This facilitates the interaction between molecular chains and consequently the formation of a micro phase separation structure. Thus, use of at least one of the compounds having the general formulae (1), (2), and (3) can achieve higher levels of strength and flexibility and further improve the scratch resistance and highlighter resistance of images even at high acid values. Among the compounds having the general formulae (1), (2), and (3), the compound having a sulfo group may be at least one of 2-aminoethanesulfonic acid, 2-hydroxyethanesulfonic acid, and 2-(methylamino)ethanesulfonic acid.

An acid value of the unit derived from a compound having a sulfo group is 1.0% or more and 30.0% or less of the acid value of the polyurethane polymer. An acid value below 1.0% of the acid value of the polyurethane polymer may result in small effects of the sulfo group and consequently insufficient improving effects on the scratch resistance and highlighter resistance of images and ink ejection stability. An acid value above 30.0% may result in excessively high hydrophilicity of the sulfo group and consequently insufficient improving effects on the scratch resistance and highlighter resistance of images.

An acid value of the unit derived from a compound having a sulfo group is 0.01 times or more and 0.43 times or less the acid value of the unit derived from a compound having a carboxy group. An acid value below 0.01 times the acid value of the unit derived from a compound having a carboxy group may result in small effects of the sulfo group and consequently insufficient improving effects on the scratch resistance and highlighter resistance of images and ink ejection stability. An acid value above 0.43 times may result in excessively high hydrophilicity of the sulfo group and consequently insufficient improving effects on the scratch resistance and highlighter resistance of images.

A polyurethane polymer according to an embodiment of the present invention may further have a hydrophilic group other than the carboxy group and the sulfo group, such as a phosphonate group. Examples of a compound having a phosphonate group for use in the synthesis of the polyurethane polymer include, but are not limited to, sodium 2,3-dihydroxypropyl-phenylphosphonate, potassium bis(2-hydroxyethyl) phosphonate, and sodium bis(4-hydroxybutyl)phosphonate.

Chain Extension Agent

A chain extension agent is a compound that can react with a residual isocyanate group in a polyisocyanate unit of a urethane prepolymer. The residual isocyanate group is an isocyanate group that does not form a urethane bond. Examples of a chain extension agent that can be used in the synthesis of a polyurethane polymer according to an embodiment of the present invention include, but are not limited to, polyvalent amine compounds, such as trimethylolmelamine and derivatives thereof, dimethylolurea and derivatives thereof, dimethylolethylamine, diethanolmethylamine, dipropanolethylamine, dibutanolmethylamine, ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, and hydrazine, polyamide polyamine, and polyethylene polyimine. These chain extension agents may be used alone or in combination.

Synthesis Method and Analysis Method of Polyurethane Polymer

A method for synthesizing a polyurethane polymer according to an embodiment of the present invention may be any known method, such as a one-shot process or a multistage process.

The composition, the molecular weight, and the acid value of the polyurethane polymer can be measured by conventional methods. Specifically, an ink can be separated into a sediment and a supernatant liquid by centrifugation, and the sediment and supernatant liquid can be analyzed. Since the pigment is insoluble in organic solvents, the polyurethane polymer can also be isolated by solvent extraction. Although the ink itself can be analyzed, the isolation of the polyurethane polymer can improve the accuracy of measurement. More specifically, after the ink is centrifuged at 80,000 rpm, the supernatant liquid is analyzed with a Fourier transform infrared spectrophotometer (FT-IR). The types of polyisocyanate and polyol can easily be determined from the absorption wavelengths characteristic of the urethane bond. The supernatant liquid can be precipitated with hydrochloric acid, and the dried precipitate can be dissolved in chloroform. The chloroform solution can be subjected to nuclear magnetic resonance (NMR) to determine the molecular weight of the polyol. The acid value of the polyurethane polymer can be measured by titrimetry. In the examples described below, the acid value of the polyurethane polymer can be measured by potentiometric titration of the polymer dissolved in tetrahydrofuran (THF) with an automatic potentiometric titrator AT510 (manufactured by Kyoto Electronics Manufacturing Co., Ltd.) using a potassium hydroxide-ethanol titrant. The proportion (%) of the acid value of the unit derived from a compound having a sulfo group based on the acid value of the polyurethane polymer can be determined by measuring the sulfur concentration of the polymer by ICP spectroscopy. The average molecular weight of the polyurethane polymer can be measured by gel permeation chromatography (GPC). The conditions for GPC are as follows:

Apparatus: Alliance GPC 2695 (manufactured by Waters Co.),
Column: Four Shodex KF-806M columns (manufactured by Showa Denko K.K.) in series,
Mobile phase: THF (a guaranteed reagent),
Flow rate: 1.0 mL/min,
Oven temperature: 40.0° C.,
Injection volume of sample solution: 0.1 mL,
Detector: refractive index (RI), and
Polystyrene standard samples: PS-1 and PS-2

(manufactured by Polymer Laboratories Ltd.) (17 samples having a molecular weight of 7,500,000, 2,560,000, 841,700, 377,400, 320,000, 210,500, 148,000, 96,000, 59,500, 50,400, 28,500, 20,650, 10,850, 5,460, 2,930, 1,300, and 580).

The amount (% by mass) of polyurethane polymer for use in an ink according to an embodiment of the present invention may preferably be less than 2.0% by mass, more preferably 0.1% or more but less than 2.0% by mass, based on the total mass of the ink. Less than 0.1% by mass of the polyurethane polymer may have insufficient improving effects on the scratch resistance and highlighter resistance of images. 2.0% by mass or more of the polyurethane polymer may have insufficient improving effects on ink ejection stability. The ink may further contain another polymer without compromising the advantages of the present invention.

A polyurethane polymer for use in an ink according to an embodiment of the present invention preferably has a polystyrene equivalent weight-average molecular weight (Mw) in the range of 10,000 to 60,000, more preferably 12,000 to 15,900, as determined by gel permeation chromatography (GPC).

Pigment

Examples of the pigment for use in an ink according to an embodiment of the present invention include, but are not limited to, self-dispersing pigments having at least one hydrophilic group bonded directly or through another atomic group to the pigment surface and polymer-dispersed pigments in which the pigment is dispersed by using a polymer dispersant.

Examples of the pigment for use in an ink according to an embodiment of the present invention also include, but are not limited to, inorganic and organic pigments, such as carbon black. Any known pigment can be used in an ink jet ink according to an embodiment of the present invention. The amount (% by mass) of pigment in the ink ranges from 0.1% to 15.0% by mass, preferably 1.0% to 8.0% by mass, based on the total mass of the ink. A pigment content below 1.0% by mass may result in insufficient optical density. A pigment content above 8.0% by mass may result in poor ink jet characteristics, such as sticking resistance.

Aqueous Medium

An ink according to an embodiment of the present invention may contain an aqueous medium, such as water or a mixed solvent of water and a water-soluble organic solvent. The amount (% by mass) of water-soluble organic solvent in the ink may range from 3.0% to 50.0% by mass based on the total mass of the ink. The water-soluble organic solvent may be any known solvent generally used in ink jet inks. Examples of the water-soluble organic solvent include, but are not limited to, alkyl alcohols having 1 to 4 carbon atoms, amides, ketones, keto-alcohols, ethers, poly(alkylene glycol)s, glycols, alkylene glycols in which the alkylene group has 2 to 6 carbon atoms, polyhydric alcohols, alkyl ether acetates, alkyl ethers of polyhydric alcohols, nitrogen-containing compounds, and sulfur-containing compounds. These water-soluble organic solvents may be used alone or in combination. Water can be deionized water (ion-exchanged water). The water content (% by mass) of the ink may range from 50.0% to 95.0% by mass based on the total mass of the ink. The ink viscosity at 25° C. may be 6 cps or less. The ink viscosity can be controlled through the composition and amount of the aqueous medium. An ink viscosity above 6 cps at 25° C. may result in insufficient improving effects on ink ejection stability.

Other Additive Agents

In addition to the components described above, an ink according to an embodiment of the present invention may further contain a water-soluble organic compound that is solid at normal temperature, for example, a polyhydric alcohol, such as trimethylolpropane or trimethylolethane, urea, or a urea derivative, such as ethylene urea. An ink according to an embodiment of the present invention may also contain an additive agent, such as a polymer other than the polyurethane polymer, a surfactant, a pH adjusting agent, an anticorrosive, a preservative, a fungicide, an antioxidant, a reduction inhibitor, an evaporation accelerator, and/or a chelator. In the case that an ink contains a polymer other than the polyurethane polymer, the total amount of polymers in the ink may range from 0.01% to 10.0% by mass based on the total mass of the ink.

Ink Cartridge

An ink cartridge according to an embodiment of the present invention includes an ink storage portion for storing an ink according to an embodiment of the present invention. The ink storage portion may include an ink chamber and a chamber for housing a negative-pressure-generating member. The ink chamber can store liquid ink. The negative-pressure-generating member can store ink by the action of a negative pressure. Alternatively, an ink cartridge according to an embodiment of the present invention may include no ink chamber and include an ink storage portion that includes a negative-pressure-generating member for storing the whole ink. Alternatively, an ink cartridge according to an embodiment of the present invention may include an ink storage portion and a recording head.

Ink Jet Recording Method

In an ink jet recording method according to an embodiment of the present invention, recording is performed by discharging an ink according to an embodiment of the present invention from a discharge port of a recording head onto a recording medium by an ink jet method in response to recording signals. The ink may be discharged from a discharge port of a recording head by the action of thermal energy. The term "recording", as used herein, includes recording on a recording medium, such as a sheet of glossy paper or plain paper, with an ink according to an embodiment of the present invention or printing on a non-liquid-absorbing substrate, such as a glass sheet, a plastic sheet, or a film, with an ink according to an embodiment of the present invention.

EXAMPLES

The present invention will be further described in the following examples and comparative examples. However, the present invention is not limited to these examples. Unless otherwise specified, "part" and "%" in the examples are based on mass.

Pigment Dispersion
Preparation of Pigment Dispersion A

A commercially available Cab-O-Jet400 (manufactured by Cabot Co.), which is a self-dispersing pigment, was sufficiently stirred in water to prepare a pigment dispersion A. The pigment dispersion A had a pigment content of 10.0% and a pH of 9.0. The pigment had an average particle size of 110 nm.

Preparation of Pigment Dispersion B 1.5 g of 4-amino-1,2-benzenedicarboxylic acid was added to a solution containing 5 g of concentrated hydrochloric acid dissolved in 5.5 g of water at 5° C. A vessel containing this solution was placed in an ice bath to maintain the solution at 10° C. or less. To this solution was added a solution containing 1.8 g of sodium nitrite dissolved in 9 g of water at 5° C. After the solution was stirred for 15 minutes, 6 g of carbon black was added while stirring. The carbon black had a specific surface area of 220 m$^2$/g and a DBP absorption of 105 mL/100 g. After the solution was stirred for another 15 minutes, the resulting slurry was filtered through a filter paper (trade name standard filter paper No. 2, manufactured by Advantec Toyo Kaisha, Ltd.). Particles on the filter were sufficiently washed with water. The particles were dried in an oven at 110° C. to prepare self-dispersing carbon black. The self-dispersing carbon black was dispersed in water at a pigment content of 10.0% to prepare a dispersion. This pigment dispersion contained self-dispersing carbon black having a —$C_6H_3$—$(COONa)_2$ group on the surface. Sodium ions of the pigment dispersion were then substituted with potassium ions by an ion exchange method to prepare a pigment dispersion B. The pigment dispersion B contained self-dispersing carbon black having a —$C_6H_3$—$(COOK)_2$ group on the surface. The pigment dispersion B had a pigment content of 10.0% and a pH of 8.0. The pigment had an average particle size of 80 nm.

Preparation of Pigment Dispersion C

Five hundred grams of carbon black having a specific surface area of 220 m$^2$/g and a DBP absorption of 112 mL/100 g, 45 g of aminophenyl(2-sulfoethyl)sulfone, and 900 g of distilled water in a reactor were stirred at 300 rpm at a temperature of 55° C. for 20 minutes. Forty grams of 25% sodium nitrite was then added dropwise to the mixture for 15 minutes. After 50 g of distilled water was further added to the mixture, the mixture was allowed to react at 60° C. for two hours. The resulting product was removed from the reactor while being diluted with distilled water such that the solid content was 15.0%. After centrifugation and purification to remove impurities, a dispersion (1) was obtained. Carbon black in the dispersion (1) had aminophenyl(2-sulfoethyl)sulfone functional groups bonded to the surface. The number of moles of functional groups bonded to carbon black in the dispersion (1) was determined as described below. The sodium ion concentration of the dispersion (1) measured with a probe-type sodium electrode was converted into a value per mole of carbon black powder to determine the number of moles of functional groups bonded to carbon black. The dispersion (1) was then added dropwise to a pentaethylenehexamine solution for one hour with vigorous stirring while the temperature was maintained at room temperature. The pentaethylenehexamine content ranged from 1 to 10 times the number of moles of sodium ions measured above. The amount of solution was equal to the amount of dispersion (1). After this mixture was stirred for 18 to 48 hours, the mixture was purified to yield a dispersion (2) having a solid content of 10.0%. Carbon black in the dispersion (2) had pentaethylenehexamine bonded to the surface.

One hundred ninety grams of a styrene-acrylic acid polymer was weighed. The styrene-acrylic acid polymer had a weight-average molecular weight of 8,000, an acid value of 140 mgKOH/g, and a polydispersity Mw/Mn of 1.5 (wherein Mw denotes the weight-average molecular weight, and Mn denotes the number-average molecular weight). Eighteen hundred grams of distilled water and then potassium hydroxide for neutralizing the polymer were added to the styrene-acrylic acid polymer. The styrene-acrylic acid polymer was dissolved in the distilled water while stirring to prepare an aqueous styrene-acrylic acid polymer solution. Five hundred grams of the dispersion (2) was then added dropwise to the aqueous styrene-acrylic acid polymer solution while stirring. This mixture of the dispersion (2) and the aqueous styrene-acrylic acid polymer solution was transferred to an evaporating dish, was heated at 150° C. for 15 hours, was dried, and was cooled to room temperature.

The dried product was then dispersed in distilled water, which was adjusted to pH 9.0 with potassium hydroxide in advance, with a dispersing apparatus. 1.0 N aqueous potassium hydroxide was added to the dispersion while stirring to adjust the pH within the range of 10 to 11. The dispersion was then desalinated and purified to remove impurities and coarse particles. Through these procedures, a pigment dispersion C containing polymer-bonded self-dispersing carbon black dispersed in water was prepared. The pigment dispersion C had a solid content of 10.0% and a pH of 10.1. The pigment had an average particle size of 130 nm.

Preparation of Pigment Dispersion D

Ten parts of carbon black were mixed with 20 parts of a styrene-acrylic acid copolymer and 70 parts of water. The carbon black had a specific surface area of 210 m$^2$/g and a DBP absorption of 74 mL/100 g. The styrene-acrylic acid copolymer had an acid value of 200 mgKOH/g and a weight-average molecular weight of 10,000 and was neutralized with 10% aqueous potassium hydroxide. This mixture was dispersed in a sand grinder for one hour, was centrifuged to remove coarse particles, and was filtrated under pressure through a microfilter having a pore size of 3.0 μm (manufactured by FUJIFILM Co.). Through these procedures, a pigment dispersion D containing polymer-dispersed carbon black dispersed in water was prepared. The pigment dispersion D had a solid content of 10.0% and a pH of 10.0. The pigment had an average particle size of 120 nm.

Preparation of Polyurethane Polymer Dispersion
Preparation of Polyurethane Polymer Dispersions PU-1 to PU-33 and PU-35

A polyol (portion B) was sufficiently dissolved in methyl ethyl ketone while stirring. A polyisocyanate (portion A), a compound having a carboxy group (portion C), and a compound having a sulfo group (portion D) (and bis(2-hydroxyethyl)phosphonic acid (portion E) in the cases of PU-21, PU-22, and PU-23) were then added to the solution. A reaction at 75° C. for one hour yielded a prepolymer solution. The prepolymer solution was cooled to 60° C., and aqueous potassium hydroxide was added to neutralize the carboxy group. After the prepolymer solution was cooled to 40° C., ion-exchanged water was added to the prepolymer solution. The prepolymer solution was emulsified with a homomixer at a high speed. After the emulsification, a chain extension reaction of the prepolymer was performed with a chain extension agent (portion F) at 30° C. for 12 hours. When FT-IR detected no isocyanate group, the polymer solution was heated under reduced pressure to evaporate methyl ethyl ketone, yielding polyurethane polymer dispersions PU-1 to PU-33 and PU-35 each having a polyurethane polymer content of 20.0%. The acid value of the polyurethane polymer was measured by potentiometric titration with the potassium hydroxide-methanol titrant. Tables 1 to 3 show the preparation conditions and properties of the polyurethane polymer dispersions. The abbreviations in Tables 1 to 3 are as follows:

2-HEPA: bis(2-hydroxyethyl)phosphonic acid
IPDI: isophorone diisocyanate
TDI: tolylene diisocyanate
HDI: hexamethylene diisocyanate
PPG: poly(propylene glycol)
PCPO: hexane-diol-based polycarbonate polyol
PEPO: phthalic-acid-based polyester polyol
PTMG: poly(tetramethylene glycol)
DMPA: dimethylolpropionic acid
DMBA: dimethylolbutanoic acid
DABS: diaminobutanesulfonic acid
DHBS: dihydroxybutanesulfonic acid
2-AES: 2-aminoethanesulfonic acid
2-HES: 2-hydroxyethanesulfonic acid
2-MES: 2-(methylamino)ethanesulfonic acid
EDA: ethylenediamine

TABLE 1

Preparation conditions and properties of polyurethane polymer dispersions

| | | Polyurethane polymer dispersion | | | | | | | | | |
|---|---|---|---|---|---|---|---|---|---|---|---|
| | | PU-1 | PU-2 | PU-3 | PU-4 | PU-5 | PU-6 | PU-7 | PU-8 | PU-9 | PU-10 |
| Polyisocyanate | Type | IPDI | IPDI | TDI | HDI | IPDI | IPDI | IPDI | IPDI | IPDI | IPDI |
| | A (parts) | 33.4 | 35.2 | 26.9 | 26.0 | 33.4 | 33.4 | 33.4 | 35.1 | 31.2 | 18.9 |
| Polyol | Type | PPG | PPG | PPG | PPG | PTMG | PCPO | PEPO | PPG | PPG | PPG |
| | B (parts) | 52.4 | 49.7 | 58.9 | 59.8 | 52.4 | 52.4 | 52.4 | 50.7 | 54.8 | 76.7 |
| Component having carboxy group | Type | DMPA | DMPA | DMPA | DMPA | DMPA | DMPA | DMPA | DMPA | DMPA | DMPA |
| | C (parts) | 12.2 | 12.2 | 12.2 | 12.2 | 12.2 | 12.2 | 12.2 | 14.2 | 9.6 | 4.4 |
| Component having sulfo group | Type | 2-AES | DHBS | 2-AES | 2-AES | 2-AES | 2-AES | 2-AES | 2-AES | 2-AES | 2-AES |
| | D (parts) | 2.00 | 2.90 | 2.00 | 2.00 | 2.00 | 2.00 | 2.00 | 0.01 | 4.40 | 0.04 |
| 2-HEPA | E (parts) | — | — | — | — | — | — | — | — | — | — |
| Chain extension agent | Type | EDA | EDA | EDA | EDA | EDA | EDA | EDA | EDA | EDA | EDA |
| | F (parts) | 1.5 | 1.6 | 1.6 | 1.6 | 1.5 | 1.5 | 1.5 | 1.6 | 1.4 | 0.9 |
| Acid value of polyurethane polymer (mgKOH/g) | | 60 | 60 | 60 | 60 | 60 | 60 | 60 | 60 | 60 | 20 |
| Proportion (%) of acid value of unit derived from compound having sulfo group | | 15.0 | 15.0 | 15.0 | 15.0 | 15.0 | 15.0 | 15.0 | 0.1 | 33.0 | 0.9 |
| Acid value of unit derived from compound having sulfo group/acid value of unit derived from compound having carboxy group | | 0.18 | 0.18 | 0.18 | 0.18 | 0.18 | 0.18 | 0.18 | 0.001 | 0.49 | 0.009 |
| Weight-average molecular weight ($\times 10^3$) | | 15.0 | 14.0 | 15.5 | 15.0 | 15.0 | 15.7 | 14.9 | 15.0 | 14.0 | 14.8 |

TABLE 2

Preparation conditions and properties of polyurethane polymer dispersions

| | | Polyurethane polymer dispersion | | | | | | | | | |
|---|---|---|---|---|---|---|---|---|---|---|---|
| | | PU-11 | PU-12 | PU-13 | PU-14 | PU-15 | PU-16 | PU-17 | PU-18 | PU-19 | PU-20 | PU-21 |
| Polyisocyanate | Type | IPDI | IPDI | IPDI | IPDI | IPDI | IPDI | IPDI | IPDI | IPDI | IPDI | IPDI |
| | A (parts) | 44.1 | 33.3 | 34.0 | 31.5 | 31.4 | 35.2 | 35.2 | 28.3 | 33.2 | 33.3 | 31.5 |
| Polyol | Type | PPG | PPG | PPG | PPG | PPG | PPG | PTMG | PPG | PPG | PPG | PPG |
| | B (parts) | 32.5 | 53.6 | 51.7 | 54.4 | 54.5 | 49.9 | 49.9 | 57.5 | 51.3 | 52.5 | 54.5 |
| Component having carboxy group | Type | DMPA | DMPA | DMPA | DMPA | DMPA | DMPA | DMPA | DMPA | DMBA | DMPA | DMPA |
| | C (parts) | 16.0 | 13.0 | 12.9 | 10.0 | 9.9 | 12.2 | 12.2 | 12.2 | 13.5 | 12.2 | 10.0 |
| Component having sulfo group | Type | 2-AES | 2-AES | 2-AES | 2-AES | 2-AES | DABS | DABS | 2-AES | 2-AES | 2-HES | 2-AES |
| | D (parts) | 7.40 | 0.12 | 1.34 | 4.00 | 4.10 | 2.70 | 2.70 | 2.00 | 2.00 | 2.00 | 2.00 |
| 2-HEPA | E (parts) | — | — | — | — | — | — | — | — | — | — | 2.0 |
| Chain extension agent | Type | EDA | EDA | EDA | EDA | EDA | EDA | — | EDA | EDA | EDA | EDA |
| | F (parts) | 2.0 | 1.5 | 1.6 | 1.4 | 1.4 | 1.6 | 1.6 | — | 1.5 | 1.5 | 1.4 |
| Acid value of polyurethane polymer (mgKOH/g) | | 100 | 60 | 60 | 60 | 60 | 60 | 60 | 60 | 60 | 60 | 60 |
| Proportion (%) of acid value of unit derived from compound having sulfo group | | 33.0 | 0.9 | 1.0 | 30.0 | 31.0 | 15.0 | 15.0 | 15.0 | 15.0 | 15.0 | 15.0 |

TABLE 2-continued

Preparation conditions and properties of polyurethane polymer dispersions

| | Polyurethane polymer dispersion | | | | | | | | | | |
|---|---|---|---|---|---|---|---|---|---|---|---|
| | PU-11 | PU-12 | PU-13 | PU-14 | PU-15 | PU-16 | PU-17 | PU-18 | PU-19 | PU-20 | PU-21 |
| Acid value of unit derived from compound having sulfo group/acid value of unit derived from compound having carboxy group | 0.493 | 0.009 | 0.01 | 0.43 | 0.45 | 0.18 | 0.18 | 0.18 | 0.18 | 0.18 | 0.18 |
| Weight-average molecular weight (×10³) | 13.5 | 15.0 | 15.9 | 14.0 | 14.0 | 14.5 | 14.5 | 12.0 | 14.5 | 14.5 | 14.0 |

TABLE 3

Preparation conditions and properties of polyurethane polymer dispersions

| | | Polyurethane polymer dispersion | | | | | | |
|---|---|---|---|---|---|---|---|---|
| | | PU-22 | PU-23 | PU-24 | PU-25 | PU-26 | PU-27 | PU-28 |
| Polyisocyanate | Type | IPDI | IPDI | IPDI | IPDI | IPDI | IPDI | IPDI |
| | A (parts) | 33.3 | 22.7 | 19.2 | 35.2 | 51.2 | 15.2 | 22.8 |
| Polyol | Type | PPG | PPG | PPG | PPG | PPG | PPG | PPG |
| | B (parts) | 52.5 | 63.9 | 76.3 | 50.5 | 24.6 | 80.5 | 63.9 |
| Component having carboxy group | Type | DMPA | — | DMPA | DMPA | DMPA | — | — |
| | C (parts) | 12.2 | — | 4.5 | 14.3 | 24.1 | — | — |
| Component having sulfo group | Type | — | 2-AES | — | — | — | 2-AES | 2-AES |
| | D (parts) | — | 4.2 | — | — | — | 4.2 | 13.4 |
| 2-HEPA | E (parts) | 2.0 | 9.2 | — | — | — | — | — |
| Chain extension agent | Type | EDA | EDA | EDA | EDA | EDA | EDA | EDA |
| | F (parts) | 1.5 | 1.6 | 0.87 | 1.6 | 2.3 | 0.69 | 1.0 |
| Acid value of polyurethane polymer (mgKOH/g) | | 60 | 60 | 19 | 60 | 101 | 19 | 60 |
| Proportion (%) of acid value of unit derived from compound having sulfo group | | 0 | 31.0 | 0 | 0 | 0 | 100.0 | 100.0 |
| Acid value of unit derived from compound having sulfo group/acid value of unit derived from compound having carboxy group | | — | — | — | — | — | — | — |
| Weight-average molecular weight (×10³) | | 14.5 | 14.0 | 15.0 | 15.0 | 15.0 | 14.0 | 13.5 |

| | | Polyurethane polymer dispersion | | | | | |
|---|---|---|---|---|---|---|---|
| | | PU-29 | PU-30 | PU-31 | PU-32 | PU-33 | PU-35 |
| Polyisocyanate | Type | IPDI | IPDI | IPDI | IPDI | IPDI | IPDI |
| | A (parts) | 30.3 | 15.7 | 19.2 | 44.7 | 47.2 | 33.4 |
| Polyol | Type | PPG | PPG | PPG | PPG | PPG | PPG |
| | B (parts) | 47.2 | 82.0 | 76.3 | 31.6 | 27.1 | 52.2 |
| Component having carboxy group | Type | — | DMBA | DMPA | DMPA | DMPA | DMPA |
| | C (parts) | — | 2.4 | 4.5 | 16.6 | 17.6 | 12.2 |
| Component having sulfo group | Type | 2-AES | 2-AES | 2-HES | 2-AES | 2-AES | 2-MES |
| | D (parts) | 22.5 | 0.002 | 0.02 | 7.0 | 8.1 | 2.2 |
| 2-HEPA | E (parts) | — | — | — | — | — | — |
| Chain extension agent | Type | EDA | EDA | EDA | EDA | EDA | EDA |
| | F (parts) | 1.4 | 0.7 | 0.87 | 2.0 | ·2.1 | 1.5 |
| Acid value of polyurethane polymer (mgKOH/g) | | 101 | 10 | 19 | 101 | 110 | 60 |
| Proportion (%) of acid value of unit derived from compound having sulfo group | | 100.0 | 0.1 | 0.5 | 31.0 | 33.0 | 15.0 |
| Acid value of unit derived from compound having sulfo group/acid value of unit derived from compound having carboxy group | | — | 0.001 | 0.005 | 0.45 | 0.49 | 0.18 |
| Weight-average molecular weight (×10³) | | 13.0 | 15.0 | 15.0 | 14.0 | 14.0 | 15.0 |

Preparation of Polyurethane Polymer Dispersion PU-34

A polyisocyanurate was prepared by a reaction between tolylene diisocyanate and N,N',N''-tris(dimethylaminopropyl)hexahydrotriazine. 182.9 parts of the polyisocyanurate was sufficiently dissolved in N-methylpyrrolidone while stirring. 817.2 parts of a solution of 2-hydroxyethoxybenzene-4-sulfonic acid in N-methylpyrrolidone was gradually added dropwise to the solution and was allowed to react at room temperature for four hours. After ion-exchanged water was added, the solution was emulsified with a homomixer at a high speed. The polymer solution was heated under reduced pressure to evaporate methyl ethyl ketone. When FT-IR detected no isocyanate group, a polyurethane polymer dispersion PU-34 was produced. The polyurethane polymer dispersion PU-34 had a polyurethane polymer content of 20.0%, an acid value of 90 mgKOH/g, and a weight-average molecular weight of 15,000.

Calculation of Acid Value of Unit Derived from Compound Having Sulfo Group

The acid value of a unit derived from a compound having a sulfo group was measured in the polyurethane polymer dispersions PU-1 to PU-35 as described below. First, a polyurethane polymer was diluted with water, and the sulfur concentration was measured by ICP spectroscopy. The molar concentration was calculated from the sulfur concentration and the weight-average molecular weight of the raw material compound having a sulfo group. The molar concentration was converted into a potassium hydroxide equivalent to calculate the acid value of a unit derived from a compound having a sulfo group. The proportion (%) of the acid value of a unit derived from a compound having a sulfo group was then calculated on the basis of the acid value of the polyurethane polymer. Tables 1 to 3 show the results.

Preparation of Ink

Each combination of the pigment dispersions and the polyurethane polymers listed in Table 4 was sufficiently mixed with the following components. The mixtures were filtered under pressure through a membrane filter having a pore size of 1.2 µm (HDCII filter, manufactured by Pall Co.) to prepare inks.

Pigment dispersion (pigment content=10.0%) 40.0%
Polyurethane polymer dispersion (polymer content=20.0%) 5.0%
Glycerin 9.0%
Diethylene glycol 5.0%
Triethylene glycol 5.0%
Acetylenol (trade name) E100 (a surfactant manufactured by Kawaken Fine Chemicals Co., Ltd.) 0.1%
Ion-exchanged water 35.9%

An ink 38 contained a mixture of 2.5% polyurethane polymer dispersion PU-25 and 2.5% polyurethane polymer dispersion PU-28. The inks had a viscosity of 6 cps or less at 25° C.

Evaluation

In the following evaluation, the criteria AA to B refer to acceptable levels, and the criteria C and D refer to unacceptable levels.

(1) Ink Ejection Stability

An ink cartridge was filled with an ink prepared as described above and was mounted in an ink jet recording apparatus PIXUS iP3100 (manufactured by CANON KABUSHIKI KAISHA). A 19 cm×26 cm solid image (print duty=100%) was printed on ten A4-size GF-500 PPC sheets (manufactured by CANON KABUSHIKI KAISHA). Recording conditions were as follows: temperature=23° C., relative humidity=55%, and the amount of ink per drop=28 ng±10% or less. In the ink jet recording apparatus described above, a print duty of 100% corresponds to the conditions under which approximately 28 ng of one ink droplet is applied to a unit area of 1/600 dpi×1/600 dpi at a resolution of 600 dpi×600 dpi. The solid images on the fifth and tenth sheets were visually inspected to evaluate ink ejection stability. The following are evaluation criteria for ink ejection stability. Table 4 shows the evaluation results.

AA: Printed properly without white streaks or faint streaks in the tenth sheet.

A: Printed properly in the fifth sheet. White streaks or faint streaks were observed with an acceptable level in the tenth sheet.

B: A few unnoticeable white streaks or faint streaks were observed in the fifth sheet. White streaks or faint streaks were observed with an acceptable level in the tenth sheet.

C: White streaks or faint streaks were observed in the fifth and tenth sheets.

(2) Scratch Resistance

An ink cartridge was filled with an ink prepared as described above and was mounted in an ink jet recording apparatus PIXUS iP3100 (manufactured by CANON KABUSHIKI KAISHA). A 1 inch×0.5 inches black solid image (print duty=100%) was printed on a PPC sheet GF-500 (manufactured by CANON KABUSHIKI KAISHA). A Silbon paper and a weight having a contact pressure of 40 g/cm$^2$ were placed on the solid image. The solid image and the Silbon paper were rubbed together. After the Silbon paper and the weight were removed, smudges on the solid image and a transfer to the white ground of the Silbon paper were visually inspected. This test was performed 10 minutes after printing (hereinafter referred to as a "test after 10 minutes") and one day after printing (hereinafter referred to as a "test after one day") using different solid images. The following are evaluation criteria for the scratch resistance of an image. Table 4 shows the evaluation results.

AA: No smudge on the white ground was observed in the test after 10 minutes and the test after one day.

A: Although a small number of smudges on the white ground were observed in the test after 10 minutes, no smudge on the white ground was observed in the test after one day.

B: Although unnoticeable smudges on the white ground were observed in the test after 10 minutes, no smudge on the white ground was observed in the test after one day.

C: The white ground was markedly contaminated in the test after 10 minutes. Unnoticeable smudges on the white ground were observed in the test after one day.

D: The white ground was markedly contaminated in the test after 10 minutes and the test after one day.

(3) Highlighter Resistance

An ink cartridge was filled with an ink prepared as described above and was mounted in an ink jet recording apparatus PIXUS iP3100 (manufactured by CANON KABUSHIKI KAISHA). A 1/10-inch vertical rule was printed on a PPC sheet GF-500 (manufactured by CANON KABUSHIKI KAISHA). Immediately after the vertical rule was traced with a yellow highlighter OPTEX2 (manufactured by ZEBRA Co., Ltd.), a line was drawn with the yellow highlighter on the white ground to check for contamination of the pen nib and contamination of the line on the white ground. This test was performed five minutes after printing (hereinafter referred to as a "test after five minutes") and one day after printing (hereinafter referred to as a "test after one day"). The following are evaluation criteria for highlighter resistance. Table 4 shows the evaluation results.

AA: No contamination of the pen nib and no contamination of the line on the white ground were observed in the test after five minutes and in the test after one day.

A: In the test after five minutes, although a slight coloring on the pen nib was observed, little contamination of the line on the white ground was observed. In the test after one day, there were no contamination of the pen nib and no contamination of the line on the white ground.

B: In the test after five minutes and the test after one day, although a slight coloring on the pen nib was observed, little contamination of the line on the white ground was observed.

C: In the test after five minutes, the pen nib was markedly contaminated with smudges, and smudges were transferred to the white ground. In the test after one day, although coloring on the pen nib was observed, unnoticeable smudges on the white ground were observed.

D: In the test after five minutes and the test after one day, the pen nib was markedly contaminated with smudges, and smudges were transferred to the white ground.

TABLE 4

Compositions of inks and evaluation results

|  | Ink No. | Pigment dispersion | Polyurethane polymer dispersion | Ink ejection stability | Scratch resistance | Highlighter resistance |
|---|---|---|---|---|---|---|
| Example 1 | Ink 1 | A | PU-1 | AA | AA | AA |
| Example 2 | Ink 2 | B | PU-1 | AA | AA | AA |
| Example 3 | Ink 3 | C | PU-1 | AA | AA | AA |
| Example 4 | Ink 4 | D | PU-1 | AA | AA | AA |
| Example 5 | Ink 5 | A | PU-2 | A | AA | A |
| Example 6 | Ink 6 | A | PU-3 | AA | AA | AA |
| Example 7 | Ink 7 | A | PU-4 | AA | AA | AA |
| Example 8 | Ink 8 | A | PU-5 | AA | AA | A |
| Example 9 | Ink 9 | A | PU-6 | AA | AA | A |
| Example 10 | Ink 10 | A | PU-7 | AA | AA | A |
| Example 11 | Ink 11 | A | PU-8 | A | A | A |
| Example 12 | Ink 12 | A | PU-9 | AA | A | A |
| Example 13 | Ink 13 | A | PU-10 | A | AA | AA |
| Example 14 | Ink 14 | A | PU-11 | AA | A | A |
| Example 15 | Ink 15 | A | PU-12 | A | A | A |
| Example 16 | Ink 16 | A | PU-13 | AA | AA | AA |
| Example 17 | Ink 17 | A | PU-14 | AA | AA | AA |
| Example 18 | Ink 18 | A | PU-15 | AA | A | A |
| Example 19 | Ink 19 | A | PU-16 | A | AA | A |
| Example 20 | Ink 20 | A | PU-17 | A | AA | A |
| Example 21 | Ink 21 | A | PU-18 | AA | A | A |
| Example 22 | Ink 22 | A | PU-19 | AA | AA | AA |
| Example 23 | Ink 23 | A | PU-20 | AA | AA | AA |
| Example 24 | Ink 24 | A | PU-21 | A | A | A |
| Example 25 | Ink 39 | A | PU-35 | AA | AA | AA |
| Comparative Example 1 | Ink 25 | A | PU-22 | C | B | B |
| Comparative Example 2 | Ink 26 | A | PU-23 | A | C | C |
| Comparative Example 3 | Ink 27 | A | PU-24 | C | B | B |
| Comparative Example 4 | Ink 28 | A | PU-25 | B | C | C |
| Comparative Example 5 | Ink 29 | A | PU-26 | A | D | D |
| Comparative Example 6 | Ink 30 | A | PU-27 | C | B | B |
| Comparative Example 7 | Ink 31 | A | PU-28 | B | C | C |
| Comparative Example 8 | Ink 32 | A | PU-29 | A | D | D |
| Comparative Example 9 | Ink 33 | A | PU-30 | D | B | B |
| Comparative Example 10 | Ink 34 | A | PU-31 | C | B | B |
| Comparative Example 11 | Ink 35 | A | PU-32 | A | C | C |
| Comparative Example 12 | Ink 36 | A | PU-33 | A | D | D |
| Comparative Example 13 | Ink 37 | A | PU-34 | A | D | C |
| Comparative Example 14 | Ink 38 | A | PU-25 + PU-28 | B | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-285781 filed Dec. 16, 2009, which is hereby incorporated by reference herein in its entirety.

What is claimed is:

1. An ink jet ink comprising:
a pigment and a polyurethane polymer,
wherein the polyurethane polymer contains units derived from a polyisocyanate, a polyol, a compound having a carboxy group, and a compound having a sulfo group, and
wherein the acid value of the polyurethane polymer is 20 mgKOH/g or more and 100 mgKOH/g or less.

2. The ink jet ink according to claim 1, wherein the compound having a carboxy group is at least one of dimethylolpropionic acid and dimethylolbutanoic acid.

3. The ink jet ink according to claim 1, wherein the compound having a sulfo group is at least one of a compound having the following general formula (1), a compound having the following general formula (2), and a compound having the following general formula (3):

$$H_2N-R-(SO_3M)_n \quad (1)$$

$$HO-R-(SO_3M)_n \quad (2)$$

$$R'NH-R-(SO_3M)_n \quad (3)$$

wherein R and R' denote a hydrocarbon group having 1 to 20 carbon atoms, M denotes an alkali metal, ammonium, or an organic ammonium, and n is 1 or 2.

4. The ink jet ink according to claim 1, wherein the compound having a sulfo group is at least one of 2-aminoethanesulfonic acid, 2-hydroxyethanesulfonic acid, and 2-(methylamino)ethanesulfonic acid.

5. The ink jet ink according to claim 1, wherein an acid value of the unit derived from a compound having a sulfo group is from 1.0% or more to 30.0% or less the acid value of the polyurethane polymer.

6. The ink jet ink according to claim 1, wherein an acid value of the unit derived from a compound having a sulfo group is from 0.01 times or more to 0.43 times or less the acid value of the unit derived from a compound having a carboxy group.

* * * * *